(12) United States Patent
Zhang

(10) Patent No.: US 11,356,739 B2
(45) Date of Patent: Jun. 7, 2022

(54) VIDEO PLAYBACK METHOD, TERMINAL APPARATUS, AND STORAGE MEDIUM

(71) Applicant: TENCENT TECHNOLOGY (SHENZHEN) COMPANY LIMITED, Guangdong (CN)

(72) Inventor: Zhihui Zhang, Shenzhen (CN)

(73) Assignee: TENCENT TECHNOLOGY (SHENZHEN) COMPANY LTD, Shenzhen (CN)

(*) Notice: Subject to any disclaimer, the term of this patent is extended or adjusted under 35 U.S.C. 154(b) by 18 days.

(21) Appl. No.: 16/889,282

(22) Filed: Jun. 1, 2020

(65) Prior Publication Data
US 2020/0296470 A1 Sep. 17, 2020

Related U.S. Application Data

(63) Continuation of application No. PCT/CN2019/071914, filed on Jan. 16, 2019.

(30) Foreign Application Priority Data

Feb. 1, 2018 (CN) .......................... 201810101152.9

(51) Int. Cl.
*H04N 21/845* (2011.01)
*H04N 21/472* (2011.01)
(Continued)

(52) U.S. Cl.
CPC ..... *H04N 21/47217* (2013.01); *G06V 10/443* (2022.01); *H04N 21/44016* (2013.01); *H04N 21/8456* (2013.01)

(58) Field of Classification Search
None
See application file for complete search history.

(56) References Cited

U.S. PATENT DOCUMENTS

2009/0249410 A1* 10/2009 Maruyama ....... H04N 21/44016
725/88
2011/0161517 A1 6/2011 Ferguson
(Continued)

FOREIGN PATENT DOCUMENTS

CN 102957672 A 3/2013
CN 202799004 U 3/2013
(Continued)

OTHER PUBLICATIONS

Office Action for Corresponding CN 201810101152.9, dated Apr. 22, 2019.
(Continued)

*Primary Examiner* — Eileen M Adams
(74) *Attorney, Agent, or Firm* — Sughrue Mion, PLLC

(57) ABSTRACT

A video play method, a terminal device, and a storage medium for switching bitstream in a video play. The video play method includes obtaining a first image frame sequence and a second image frame sequence in response to a switch instruction to switch from a first video stream to a second video stream, the first image frame sequence in a form of the first video stream and the second image frame sequence in a form of the second video stream; determining a first image frame as a switching point in the first image frame sequence and a second image frame matching the first image frame in the second image frame sequence; determining the second image frame as a starting point in the second image frame sequence; and playing the first image frame sequence until the switching point, and playing the second image frame sequence from the starting point.

20 Claims, 13 Drawing Sheets

(51) Int. Cl.
*H04N 21/44* (2011.01)
*G06V 10/44* (2022.01)

(56) References Cited

U.S. PATENT DOCUMENTS

| | | | | |
|---|---|---|---|---|
| 2015/0039726 | A1* | 2/2015 | Hoffert | H04N 21/42623 |
| | | | | 709/219 |
| 2015/0304665 | A1 | 10/2015 | Hannuksela et al. | |
| 2018/0359499 | A1* | 12/2018 | Mavlankar | H04N 21/26275 |

FOREIGN PATENT DOCUMENTS

| | | | |
|---|---|---|---|
| CN | 104394486 | A | 3/2015 |
| CN | 104967884 | A | 10/2015 |
| CN | 105430449 | A | 3/2016 |
| CN | 105657520 | A | 6/2016 |
| CN | 106162235 | A | 11/2016 |
| CN | 106937114 | A | 7/2017 |
| CN | 108307248 | A | 7/2018 |

OTHER PUBLICATIONS

Office Action for Corresponding CN 201810101152.9, dated Jul. 11, 2019.
International Search Report for PCT/CN2019/071914, dated Feb. 27, 2019.
Written Opinion of the International Searching Authority dated Feb. 27, 2019 in International Application No. PCT/CN2019/071914.
Communication dated Sep. 28, 2021 by the European Patent Office in European Application No. 19 747 355.6.

* cited by examiner

VIDEO PLAYBACK METHOD, TERMINAL APPARATUS, AND STORAGE MEDIUM

CROSS-REFERENCE TO RELATED APPLICATION(S)

This application is based on and claims priority to PCT/CN2019/071914 filed Jan. 16, 2019 and Chinese Patent Application No. 201810101152.9, entitled "VIDEO PLAYBACK METHOD, TERMINAL APPARATUS, AND STORAGE MEDIUM" filed with the Chinese Patent Office on Feb. 1, 2018, which is incorporated by reference herein in its entirety.

BACKGROUND

1. Field

Embodiments of the disclosure relate to the field of video play, and in particular, to a video play method, a terminal device, and a storage medium.

2. Description of Related Art

With the development of multimedia technologies, a user may play video content by using different computing devices. The video content may be transcoded into a plurality of bitstreams for the user to select. During bitstream switching, in an existing solution, a new file slice or an intra frame (I frame) in a target video stream is usually selected and played. However, there may be a problem such as picture skipping during bitstream switching in the related art.

SUMMARY

This application provides a video play solution, to improve picture continuity during bitstream switching.

According to an embodiment, there is provided a video play method, performed by a terminal device. The method may include obtaining a first image frame sequence and a second image frame sequence in response to a switch instruction to switch from a first video stream to a second video stream, the first image frame sequence being in a form of the first video stream, and the second image frame sequence being in a form of the second video stream; determining a first image frame as a switching point in the first image frame sequence and a second image frame matching the first image frame in the second image frame sequence; determining the second image frame as a starting point in the second image frame sequence; and playing the first image frame sequence at the first video stream until the switching point, and playing the second image frame sequence at the second video stream from the starting point.

According to an embodiment, there is provided a terminal device, including at least one memory configured to store computer program code; at least one processor configured to access the computer program code and operate as instructed by the computer program code. The computer program code including: image obtaining code configured to cause the at least one processor to obtain a first image frame sequence and a second image frame sequence in response to a switch instruction to switch from a first video stream to a second video stream, the first image frame sequence being in a form of the first video stream, and the second image frame sequence being in a form of the second video stream; switching control code configured to cause the at least one processor to determine a first image frame as a switching point in the first image frame sequence and a second image frame matching the first image frame in the second image frame sequence and determine the second image frame as a starting point in the second image frame sequence; and video play code configured to cause the at least one processor to play the first image frame sequence at the first video stream until the switching point, and play the second image frame sequence at the second video stream from the starting point.

According to an embodiment, there is provided a non-transitory computer readable storage medium, storing one or more programs including instructions, when executed by a terminal device, causing the terminal device to: obtain a first image frame sequence and a second image frame sequence in response to a switch instruction to switch from a first video stream to a second video stream, the first image frame sequence being in a form of the first video stream, and the second image frame sequence being in a form of the second video stream; determine a first image frame as a switching point in the first image frame sequence and a second image frame matching the first image frame in the second image frame sequence and determine the second image frame as a starting point in the second image frame sequence; and play the first image frame sequence at the first video stream until the switching point, and play the second image frame sequence at the second video stream from the starting point.

According to embodiments of the disclosure, the switching point (that is, the first image frame) of the first video stream and the starting point (that is, the second image frame) of the second video stream can be determined. When the first image frame matches the second image frame, the video play solution can avoid a problem of picture playback or picture skipping during picture switching, so that smooth switching can be performed between video stream pictures, thereby improving picture continuity.

BRIEF DESCRIPTION OF THE DRAWINGS

To describe the technical solutions in embodiments of the disclosure more clearly, the following briefly provides description of the accompanying drawings for describing the embodiments. Apparently, the accompanying drawings in the following description show merely some of the embodiments of the disclosure, and a person of ordinary skill in the art may derive other embodiments from these accompanying drawings without creative efforts.

DETAILED DESCRIPTION

The technical solutions in the embodiments of the disclosure will be described in the following with reference to the accompanying drawings. The embodiments to be described herein are only some of the embodiments. All other embodiments obtained by a person of ordinary skill in the art based on the embodiments of the disclosure without creative efforts shall fall within the protection scope of the disclosure.

Figure 1:
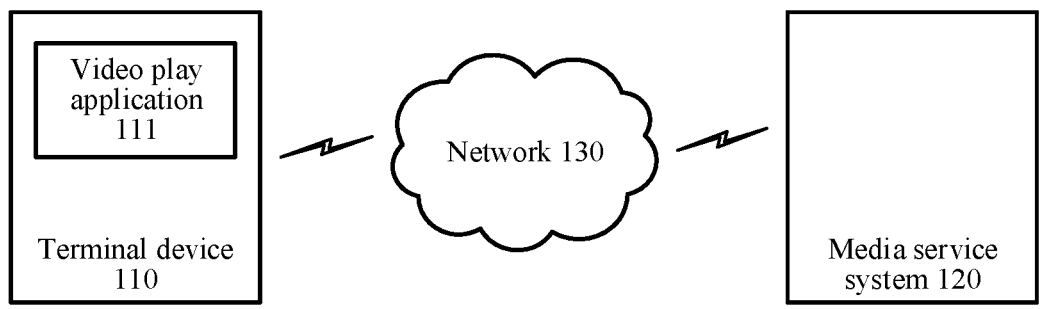
FIG. 1 is a schematic diagram illustrating an application scenario according to an embodiment.

FIG. 1 is a schematic diagram of an application scenario 100 according to an embodiment. As shown in FIG. 1, the application scenario 100 may include a terminal device 110 and a media service system 120. The terminal device 110 may be intelligent devices such as a mobile phone, a desktop computer, a laptop, a TV box, a projection device, a head-mounted display device, or a tablet computer. The terminal device 110 may include a video play application 111. Herein, the video play application 111 may be, for example, a video client (for example, Tencent Video client or Youku Video client), a social application capable of playing a video, or a browser. However, the video application may not be limited thereto. The media service system 120 may include one or more servers, and provide video content to the terminal device 110 through a network 130. The video content may be a video on demand or a live video. The media service system 120 may generate video data in various data formats by using one piece of video content. In other words, one piece of video content may correspond to a plurality of pieces of video data. For example, the data formats may be classified based on one or more of parameters such as a frame rate, a bit rate, and a resolution. Using the resolution as an example, a range of the data formats may include standard definition, high definition, super definition, and the like. In addition, the media service system 120 may transmit the video data to the terminal device 110 in a streaming format. The video data transmitted in the streaming format may be referred to as a video stream. For a piece of video content, the terminal device 110 may request one or more video streams of the video content from the media service system 120.

Figure 2:
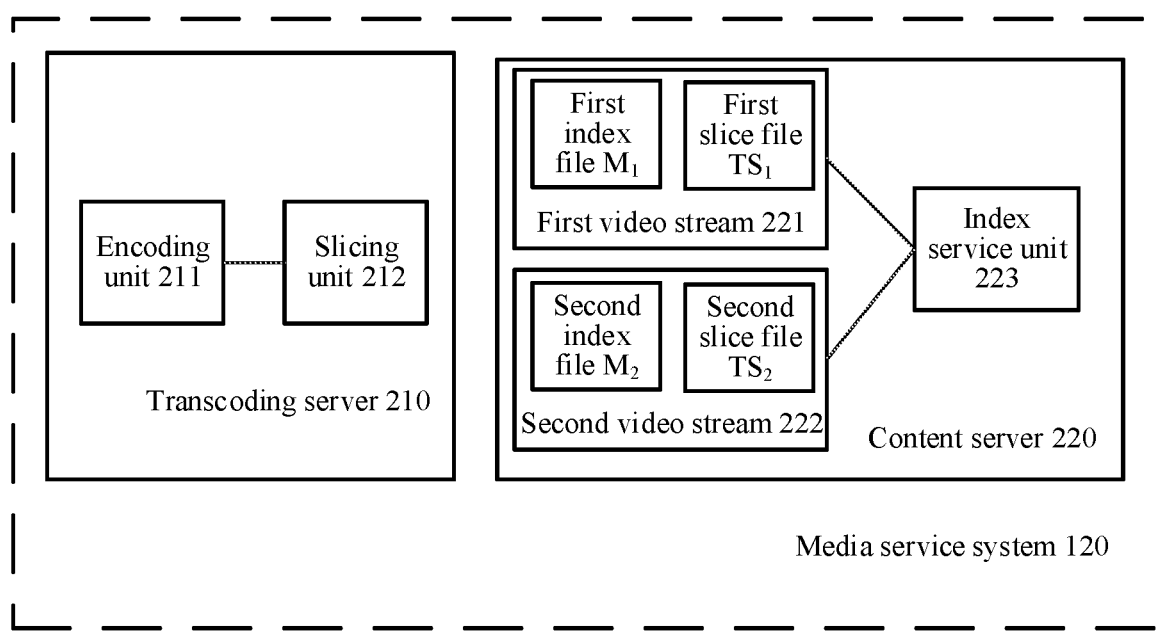
FIG. 2 is a schematic diagram illustrating a media service system according to an embodiment.

FIG. 2 is a schematic diagram of a media service system 120 according to an embodiment. As shown in FIG. 2, the media service system 120 may include a transcoding server 210 and a content server 220. The transcoding server 210 may include an encoding unit 211 and a slicing unit 212. The encoding unit 211 may encode media content to generate video data in a plurality of formats corresponding to the media content. For example, the encoding unit 211 herein may perform encoding based on the second of several standards developed by the Moving Pictures Expert Group (MPEG-2), but the embodiment is not limited hereto. The slicing unit 212 may slice video data to obtain a corresponding slice file and index file. The index file may be, for example, in a M3U8 file format. The slice file may be, for example, in a format of a transport stream (TS) slice. The content server 220 may include the slice file and the index file of the video data. The content server 220 may provide the index file to the terminal device 110 when the terminal device 110 sends a request to the content server 220. In addition, the content server 220 may provide a slice file corresponding to the index file. In an embodiment, for a piece of video content, the content server 220 may provide a first video stream 221 and a second video stream 222. The first video stream 221 may include a first index file $M_1$ and a first slice file $TS_1$. The second video stream 222 may include a second index file $M_2$ and a second slice file $TS_2$. The content server 220 may further include an index service unit 223. The index service unit 223 may send, to the terminal device 110, according to a request of the terminal device 110 for a video stream, an index file corresponding to the video stream. For example, the index service unit 223 may send the first index file $M_1$ to the terminal device 110. In this way, the terminal device 110 may request the first slice file $TS_1$ from the content server 220 according to the received first index file $M_1$. In addition, the content server 220 may include an index server and a video stream server. The terminal device 110 may send an access request for a video stream to the index server. In response to the access request, the index server may return a video address (that is, an index file) corresponding to the video stream. The terminal device 110 may receive the video address, and obtain an image frame sequence from the video stream server according to the video address.

Figure 3A:
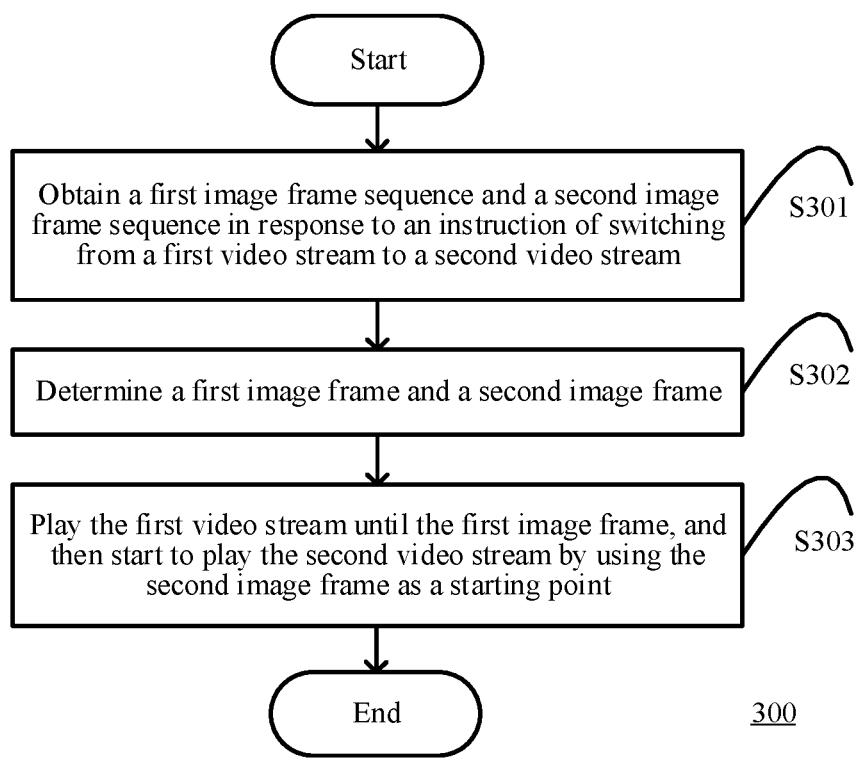
FIG. 3A is a flowchart of a video play method according to an embodiment.

FIG. 3A is a flowchart of a video play method 300 according to an embodiment. The video play method 300 may be performed by the terminal device 110. For example, the video play method 300 may be performed by the video play application 111 in the terminal device 110.

As shown in FIG. 3A, the video play method 300 may include steps S301 to S303. In step S301, a first image frame sequence and a second image frame sequence are obtained in response to an instruction to switch from a first video stream to a second video stream. The first video stream may be a video stream that is currently being played on the video play application 111 in the terminal device 110. The first image frame sequence is from the first video stream, and the second image frame sequence is from the second video stream. Here, the first image frame sequence may be a plurality of image frames that have not been played by the video play application 111.

In an embodiment, a presentation time stamp (PTS) range of image frames in the first image frame sequence may correspond to a first time interval. Similarly, a PTS range of image frames in the second image frame sequence may correspond to a second time interval. A play time of the second image frame sequence may correspond to a play time of the first image frame sequence. Here, the corresponding of the play times may mean that there is an overlap between the first time interval and the second time interval.

In an embodiment, a bitstream of the first video stream may be greater than that of the second video stream. The video play application 111 may adaptively determine whether to switch between the video streams. When it is detected that a video stream transmission bandwidth is less than a threshold bandwidth, the video play application 111 may generate an instruction to switch from the first video stream to the second video stream.

Figure 3B:
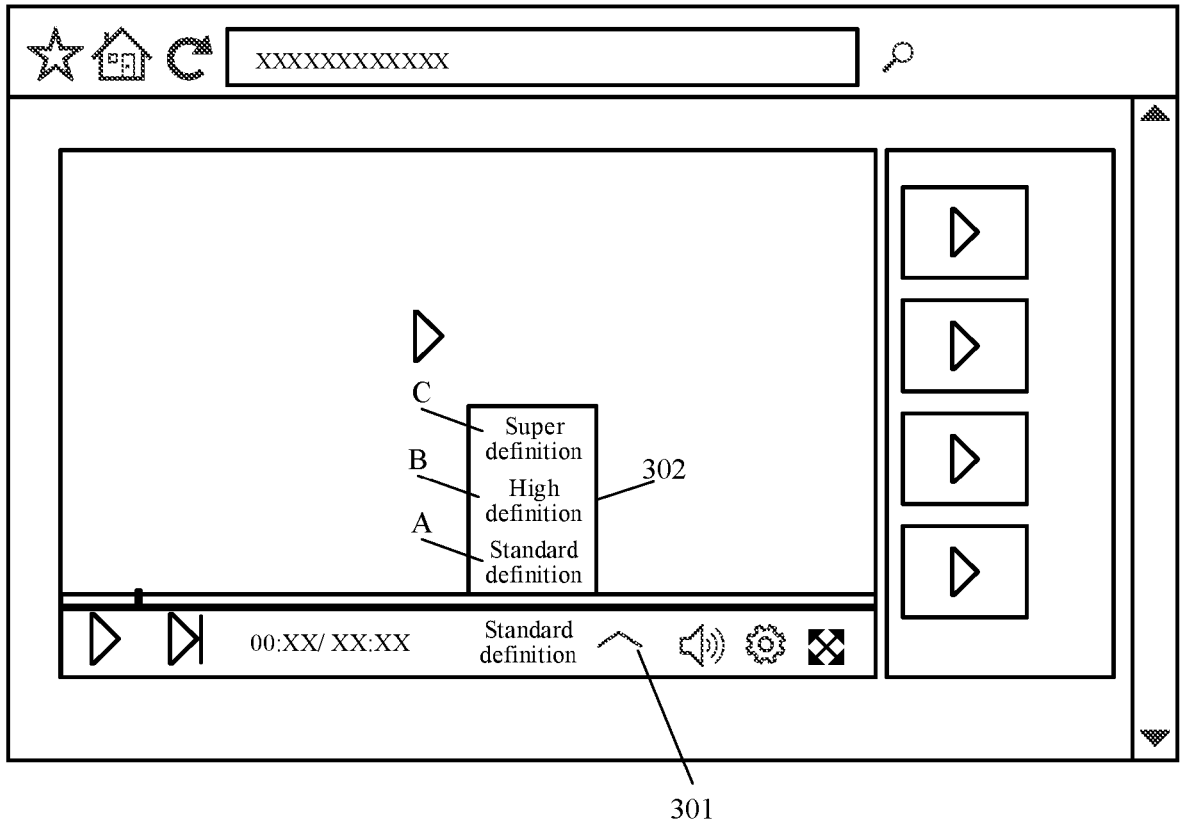
FIG. 3B is a video play interface according to an embodiment.

FIG. 3B is a video play interface according to an embodiment. In a video play interface shown in FIG. 3B, when a user clicks/taps a button 301, the video play interface may display a check box 302. The check box 302 may include, for example, three resolution options: a standard definition option A, a high definition option B, and a super definition option C. Each resolution option corresponds to one video stream. For example, the standard definition corresponds to the first video stream, and the super definition corresponds to the second video stream. When the currently played video stream is in a standard definition format and the user clicks/taps the super definition option C in the check box, the video play application 111 may generate an instruction to switch from the first video stream to the second video stream.

According to an embodiment, in step S301, a video address, for example, the second index file $M_2$, of the second video stream, may be requested from the content server 220. When the video address is received, in step S301, the corresponding second image frame sequence is requested from the content server 220 according to the video address. Similarly, in step S301, the first image frame sequence may be obtained from the content server 220.

Figure 3C:
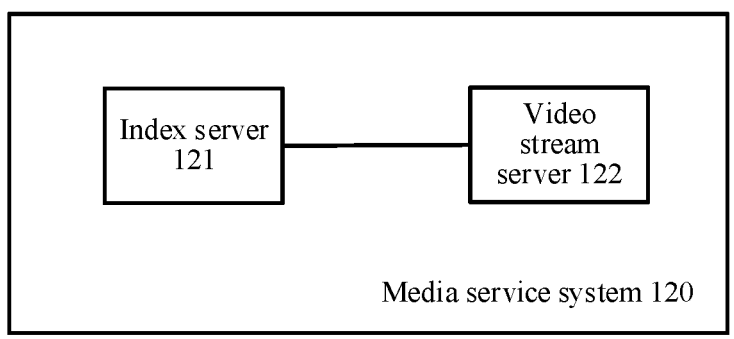
FIG. 3C is a schematic diagram illustrating a media service system according to an embodiment.

FIG. 3C is a schematic diagram illustrating a media service system according to an embodiment. The media service system 120 may include an index server 121 and a video stream server 122. The index server 121 may store video addresses of video streams. The video stream server 122 may store image frame sequences of video streams. In step S301, an access request for the second video stream may be sent to the index server 121, so that the index server 121 may return the video address corresponding to the second video stream. Accordingly, the video address corresponding to the second video stream may be received, and the second image frame sequence may be obtained from the video stream server 122 according to the video address. Similarly, in step S301, the first image frame sequence may be obtained from the video stream server 122.

In step S302, a first image frame as a switching point in the first image frame sequence and a second image frame matching the first image frame in the second image frame sequence may be determined. Here, the first image frame matching the second image frame means that the two image frames match in an image feature aspect. In some embodiments, a higher matching degree between the first image frame and the second image frame indicates closer capturing time points between the two image frames. The capturing time point is a sampling time (which may also be referred to as a shooting time) corresponding to a picture in the image frame. In step S303, the first video stream is played until the first image frame, and then the second video stream starts to be played by using the second image frame as a starting point. In step S302, the second image frame matching the first image frame may be determined based on different image matching algorithms. In step S303, the second video stream may be played starting from the second image frame. In addition, the second video stream may be played starting from an image frame right after the second image frame.

In an application scenario of video stream switching, frame rates may be different for various video streams. Therefore, PTSs of image frames of different video streams usually cannot accurately correspond to each other. In other words, the video play application 111 usually cannot perform smooth switching between two video streams according to PTSs. In the method 300, by performing step S302, the switching point (that is, the first image frame) of the first video stream and the starting point (that is, the second image frame) of the second video stream that match each other may be determined. Because the first image frame matches the second image frame, the method 300 can avoid a problem of picture playback or picture skipping during picture switching in step S303, so that smooth switching can be performed between video stream pictures, thereby improving picture continuity. The following describes a process of determining the first image frame and the second image frame by using an example.

Figure 4:
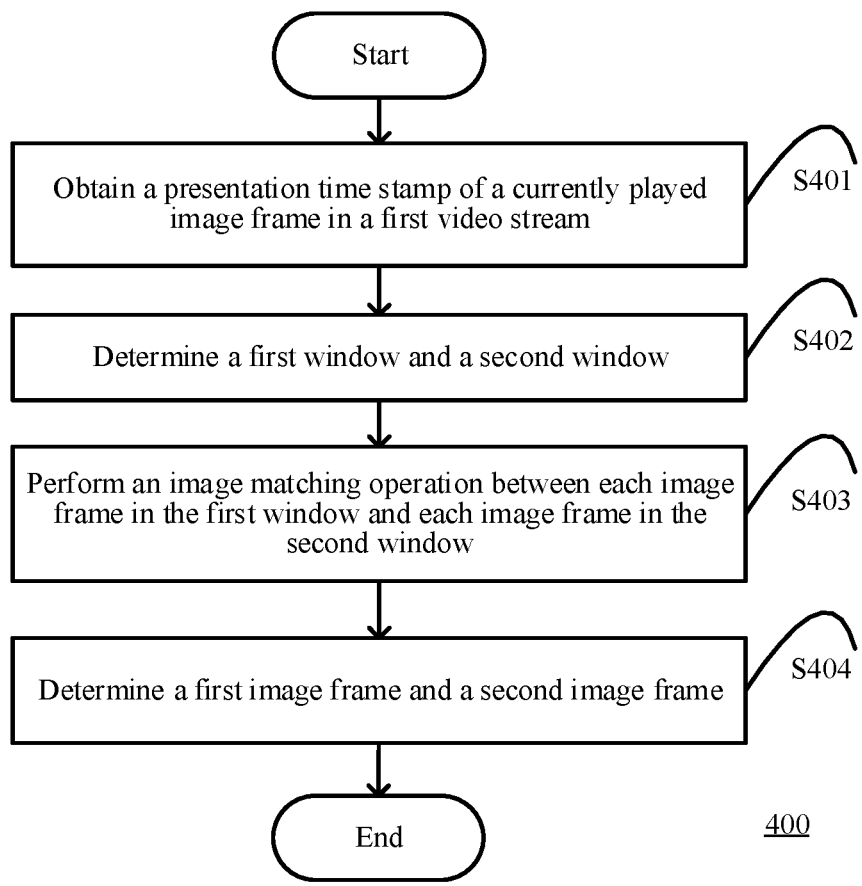
FIG. 4 is a flowchart of a method for performing step S302 in FIG. 3A according to an embodiment.

In an embodiment, step S302 may further include a method 400. As shown in FIG. 4, when the instruction to switch from the first video stream to the second video stream is received, in step S401, a PTS of a currently played image frame in the first video stream may be obtained, and this PTS may be used as a reference PTS.

In step S402, a first window and a second window are determined according to the reference PTS. The first window belongs to the first image frame sequence. The second window belongs to the second image frame sequence. According to an embodiment, in step S402, an image frame in the first image frame sequence that is spaced by a switching threshold from the reference PTS may be determined. The determined image frame may be used as a first reference image frame, and the first window centered on the first reference image frame may be determined. Herein, when the first window includes two image frames, the first window may include the first reference image frame and one adjacent image frame before (or after) the first reference image frame. Alternatively, the first window may include more than two image frames. In an embodiment, the switching threshold may be configured as a value. The switching threshold may be obtained from the media service system 120. The media service system 120 may store one or more switching operation records about switching from the first video stream to the second video stream. A switching operation record may include a time length or a quantity of frames from a play position (that is, a PTS of a currently played image frame when an instruction to switch to the second video stream is received) to a switching point in the first video stream on the terminal device. In this way, the media service system 120 may use an average value of time lengths (or quantities of frames) in the one or more switching records as the switching threshold. For example, when step S301 is performed, the video play application 111 may obtain, from the media service system 120, the switching threshold determined according to the switching operation records. In this way, in step S402, a reference switching point (that is, the first reference image frame) may be determined according to the switching threshold. In step S402, the reference switching point (the first reference image frame) is determined by using the switching threshold determined according to the switching operation records, so that the reference switching point may be closer to a finally determined actual switching point (that is, the first image frame), thereby improving efficiency of determining the switching point. Based on the determined first reference image frame, in step S402, an image frame in the second image frame sequence whose PTS is the closest to that of the first reference image frame may be further determined, and the determined image frame may be used as a second reference image frame. In this way, in step S402, the second window in the second image frame sequence that is centered on the second reference image frame may be determined. However, the second window may include one or more image frames.

Figure 5:
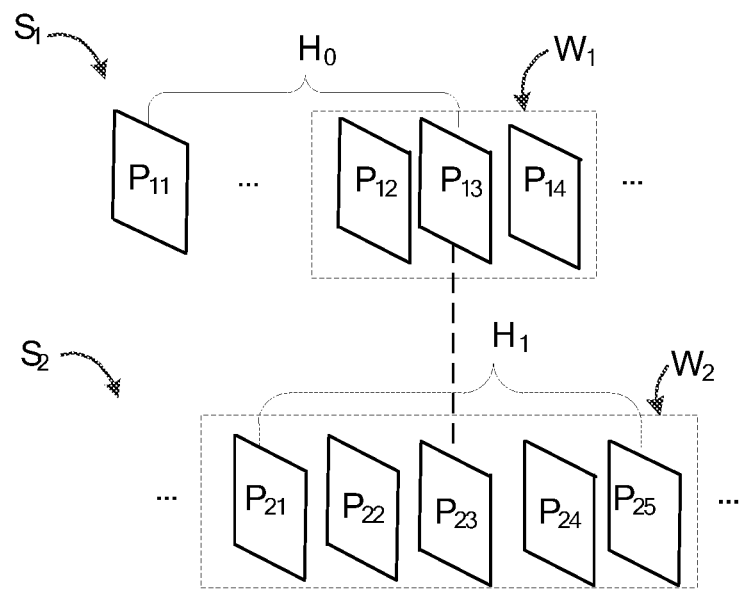
FIG. 5 is a schematic diagram illustrating a first window and a second window according to an embodiment.

FIG. 5 shows a process of determining a first window and a second window according to an embodiment. As shown in FIG. 5, a currently displayed image frame in a first image frame sequence $S_1$ is $P_{11}$. In step S401, PTSD, that is, a reference PTS, of $P_{11}$ may be obtained. In step S402, an image frame $P_{13}$ that is spaced by a switching threshold $H_0$ from $P_{11}$ may be determined, and $P_{13}$ may be used as a first reference image frame. Here, $P_{13}$ may be in the middle of a first window $W_1$, where the first window $W_1$ may include, for example, $P_{12}$, $P_{13}$, and $P_{14}$.

For a second image frame sequence $S_2$, in step S402, a second reference image frame $P_{23}$ may be determined. According to a size $H_1$ of the second window, in step S402, a second window $W_2$ may be determined. Here, the second window $W_2$ may include a plurality of consecutive image frames in the second image frame sequence, for example, includes $P_{21}$, $P_{22}$, $P_{23}$, $P_{24}$, and $P_{25}$. The size of the second window may be, for example, an image frame quantity threshold or a time length threshold. However, the embodiment is not limited thereto.

Based on the first window and the second window determined in step S402, step S403 of the method 400 may be performed. In step S403, an image matching operation is performed between each image frame in the first window and each image frame in the second window to determine two image frames having the highest matching degree. Specifically, in step S403, the image frames in the first window and the second window may be decoded (for example, decoded to be in a format such as YUV), and then the image matching operation may be performed according to a histogram of oriented gradient (HOG) algorithm. However, the algorithm for the matching operation is not limited thereto. For example, the matching operation may be performed by identifying the number of pixels of the first image frame and the number pixels of the second image frame matching each other, and determining that the first image frame and the second image frame matches when the identified matching pixels is greater than or equal to a predetermined threshold. The image matching operation may alternatively be performed by using another image matching algorithm. In addition, in step S403, when the first image frame and the second image frame are decoded, a decoding operation may be performed according to dependencies between each image frame and other image frames. For example, if a to-be-decoded image frame is a predictive frame (P frame), then decoding may be performed based on an I frame on which the P frame depends.

In step S404, one of the two image frames that belongs to the first window is used as the first image frame, and the other image frame that belongs to the second window is used as the second image frame.

According to an embodiment of the method 400, two corresponding image frame sets (that is, the first window and the second window) may be determined in the first image frame sequence and the second image frame sequence. Based on the determined image frame sets, the two matching image frames may be variously determined as the switching point and the starting point, to improve continuity between a picture before switching and a picture after switching.

Figure 6A:
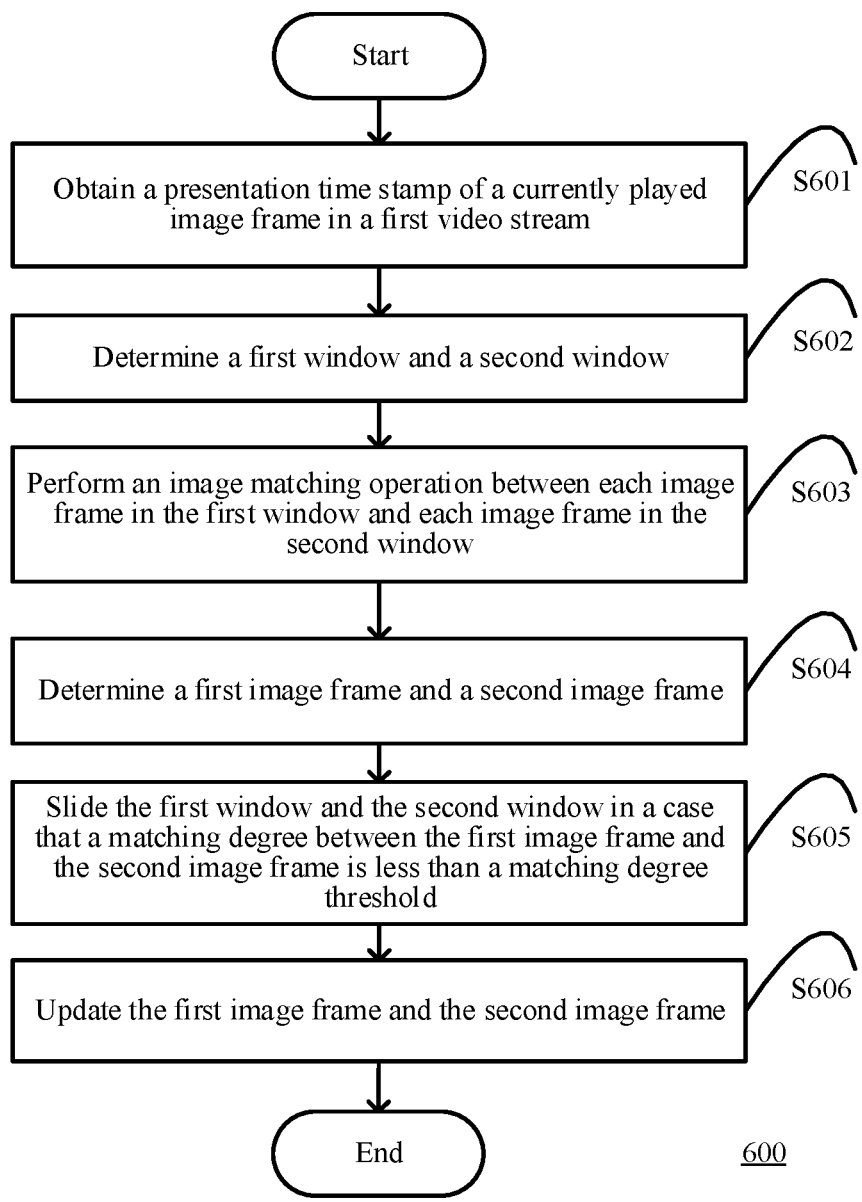
FIG. 6A is a flowchart of a method for performing step S302 in FIG. 3A according to an embodiment.

FIG. 6A is a flowchart of a method 600 for performing step S302 according to an embodiment. As shown in FIG. 6A, the method 600 may include steps S601 to S604. Here, implementations of steps S601 to S604 are similar to those of steps S401 to S404, and details described above with respect to FIG. 4 may not be described herein again.

In addition, the method 600 may further include steps S605 and S606. In step S605, the first window and the second window may be slid (or shifted) in a case that a matching degree between the first image frame and the second image frame is less than a matching degree threshold, so that the first image frame is in the middle of the slid first window, and the second image frame is in the middle of the slid second window. In step S606, the first image frame and the second image frame are updated based on the slid first window and the slid second window. Specifically, in step S606, an image matching operation may be performed between each image frame in the slid first window and each image frame in the slid second window to determine two image frames having the highest matching degree. Based on this, in step S606, one of the two image frames that belongs to the first window may be used as an updated first image frame, and the other image frame that belongs to the second window may be used as an updated second image frame. It may be further determined whether a matching degree between the updated first image frame and the updated second image frame satisfies the matching degree threshold. If the matching degree threshold is not satisfied, steps S605 and S606 of the method 600 may be further performed iteratively until a matching degree reaches the matching degree threshold.

Figure 6B:
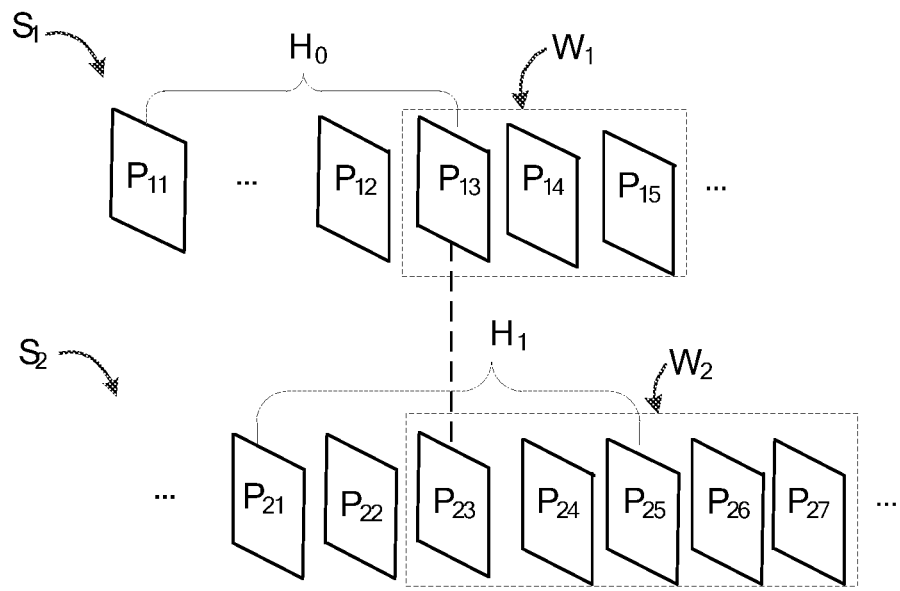
FIG. 6B is a schematic diagram illustrating the first window and the second window in FIG. 5 after sliding according to an embodiment.

Referring to FIG. 5 as an example, the first image frame determined in step S604 is $P_{14}$, and the second image frame is $P_{25}$. FIG. 6B is a schematic diagram of the first window and the second window in FIG. 5 after sliding. As shown in FIG. 6B, after the first window and the second window are slid (or shifted) in step S605, the first window $W_1$ may include image frames $P_{13}$, $P_{14}$, and $P_{15}$, and the second window $W_2$ includes image frames $P_{23}$, $P_{24}$, $P_{25}$, $P_{26}$, and $P_{27}$. For the slid first window and the slid second window, step S606 of the method 600 may be performed, to update the first image frame and the second image frame.

According to an embodiment of the method 600, the matching degree between the first image frame and the second image frame may be increased by performing steps S605 and S606, thereby improving picture continuity during picture switching in step S303.

Figure 7A:
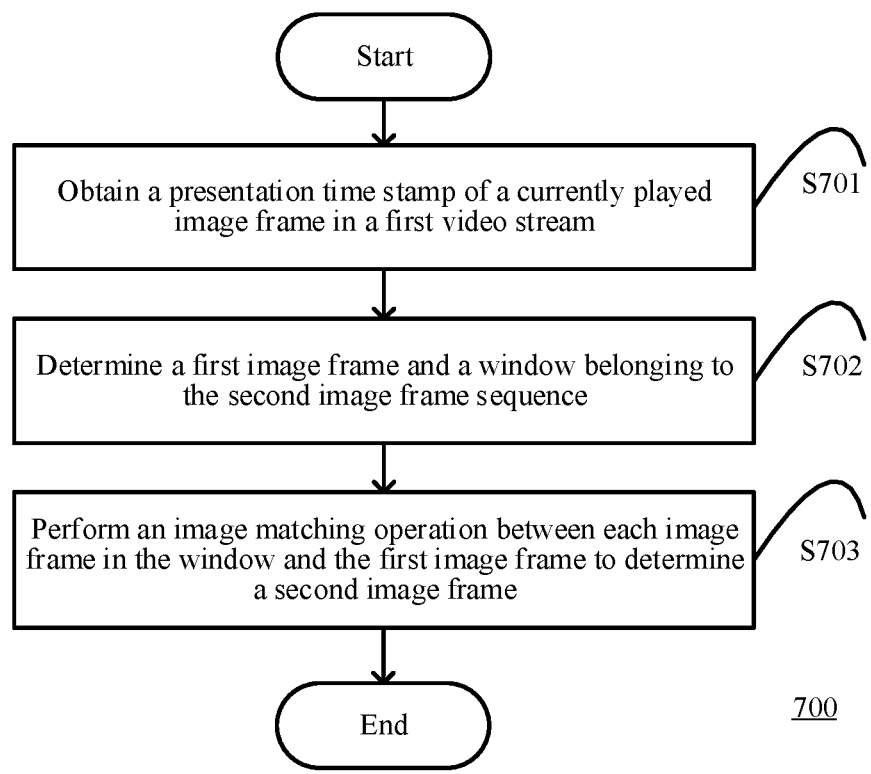
FIG. 7A is a flowchart of a method for performing step S302 in FIG. 3A according to an embodiment.

FIG. 7A is a flowchart of a method 700 for performing step S302 according to an embodiment. As shown in FIG. 7A, the method 700 includes steps S701 to S703. An implementation of step S701 is the same as that of step S401, and details described above with respect to FIG. 4 may not be described again.

In step S702, the first image frame is determined according to the reference PTS, and a window belonging to the second image frame sequence is determined. In an embodiment, an image frame in the first image frame sequence that is spaced by a switching threshold from the reference PTS may be determined, and the determined image frame may be used as the first image frame. Also, an image frame in the second image frame sequence in which PTS is the closest to that of the first image frame may be determined, and the determined image frame may be used as a second reference image frame. Based on the second reference image frame, the window in the second image frame sequence that is centered on the second reference image frame may be determined. That is, the second window of the second image frame sequence may be determined so that the second reference image frame is at the center among a plurality of image frames included in the second window.

In step S703, an image matching operation may be performed between each image frame in the first window and the first image frame, to determine an image frame having the highest matching degree with the first image frame in the first window, and the determined image frame may be used as the second image frame.

Figure 7B:
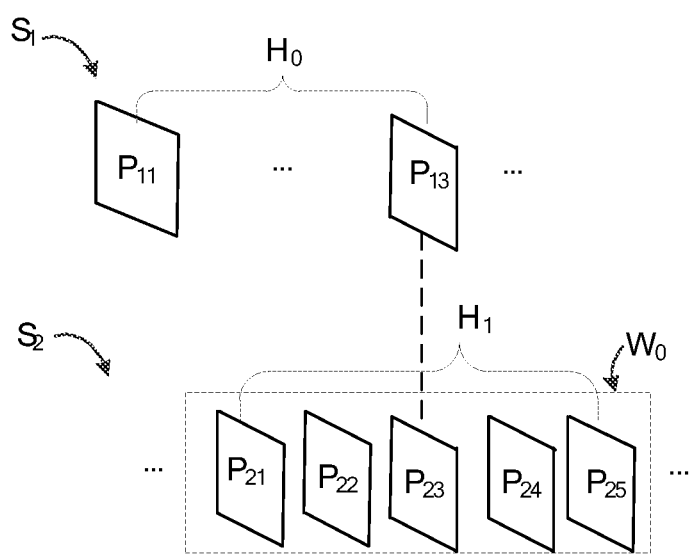
FIG. 7B is a schematic diagram of a determined window according to an embodiment.

Specifically, the following describes a process of determining the window by using FIG. 7B as an example. As shown in FIG. 7B, a currently displayed image frame in a first image frame sequence $S_1$ is $P_{11}$. In step S701, $PTS_0$, that is, a reference PTS, of $P_{11}$ may be obtained. That is, $PTS_0$ corresponding to $P_{11}$ is determined as a reference PTS. In step S702, an image frame $P_{13}$ that is spaced by a switching threshold $H_0$ from $PTS_0$ may be determined, and $P_{13}$ is used as a first image frame. Furthermore, in a second image frame sequence $S_2$, a second reference image frame $P_{23}$ that is the closest to the first image frame $P_{13}$, among a plurality of second image frames, may be determined. Thereafter, according to a size $H_1$, a window $W_0$ may be determined, which may include, for example, $P_{21}$, $P_{22}$, $P_{23}$, $P_{24}$, and $P_{25}$.

Accordingly, the first image frame may be quickly determined according to the switching threshold, and the second image frame may be selected within a range (that is, the window determined in step S702) in the second image frame sequence that is closer to the PTS of the first image frame without searching through the entire second image frame sequence. In this way, in the method 700, through a matching operation between the first image frame and each image frame within the range, an image matching degree between the switching point and the starting point may be improved, thereby improving smoothness of picture switching.

Figure 8A:
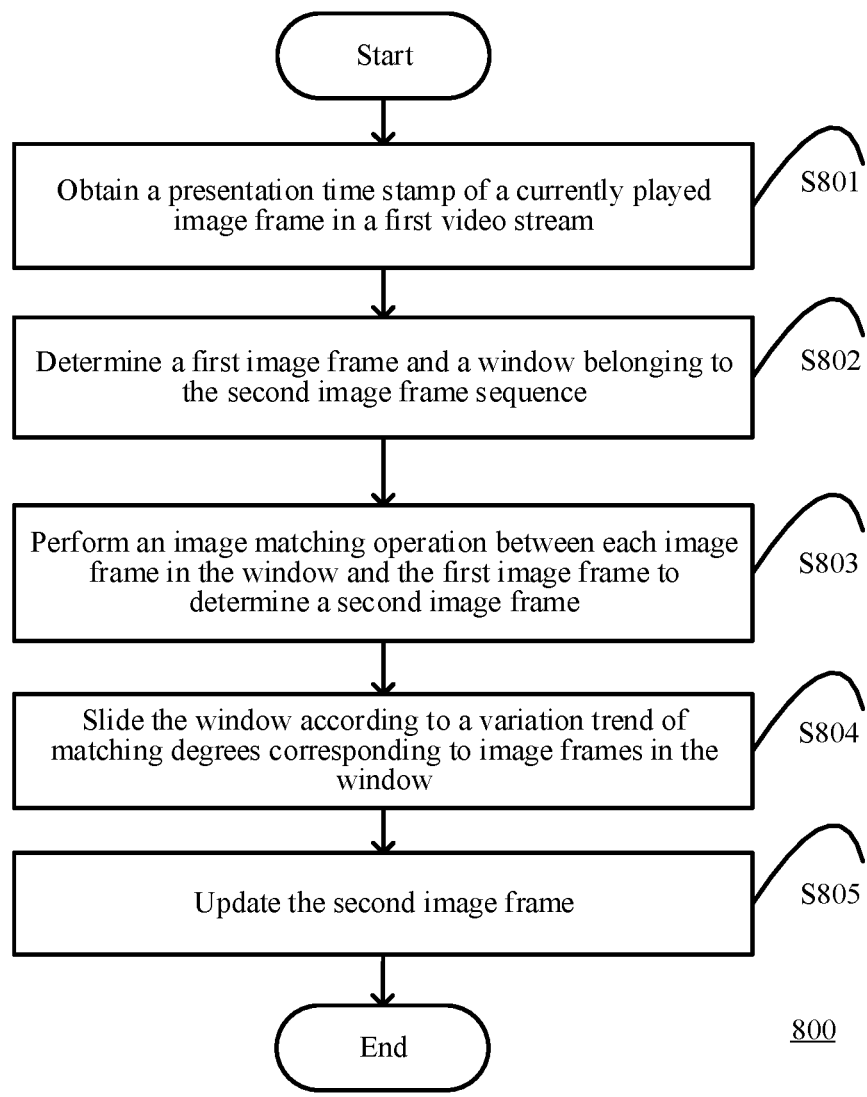
FIG. 8A is a flowchart of a method for performing step S302 according to an embodiment.

FIG. 8A is a flowchart of a method 800 for performing step S302 according to an embodiment. As shown in FIG. 8A, the method 800 may include steps S801 to S803. Herein, implementations of steps S801 to S803 are the same as those of steps S701 to S703, and details described with reference to FIG. 7A may not be described again. In addition, the method 800 may further include steps S804 and S805.

In step S804, the window may be slid or shifted according to a variation trend of matching degrees corresponding to image frames in the window in a case that a matching degree between the first image frame and the second image frame is less than a matching degree threshold. For example, referring to FIG. 7B, if a matching degree between $P_{13}$ and $P_{23}$ is less than a predetermined matching degree threshold, the window $W_0$ may be shifted so as to include an image frame that has the highest matching degree. In step S805, an image frame having the highest matching degree with the first image frame is determined in the slid window, and the second image frame is updated to the determined image frame.

According to an embodiment, in step S804, the window may be slid forward in a case that the matching degrees corresponding to the image frames in the window increase progressively. That is, a sliding direction may be the same as a direction in which the matching degree increases. Alternatively, in step S804, the window may be slid backward in a case that the matching degrees corresponding to the image frames in the window decrease progressively. In an embodiment, a sliding step length of the window may be determined according to a difference between the matching degree between the first image frame and the second image frame and the matching degree threshold. A larger difference may correspond to a larger sliding step length. In this way, an image frame range of the window may be adjusted based on the variation trend of the matching degrees according to the sliding step length. To explain in more detail, a process of sliding the window is described below with reference to FIG. 8B and FIG. 8C as examples.

Figure 8B:
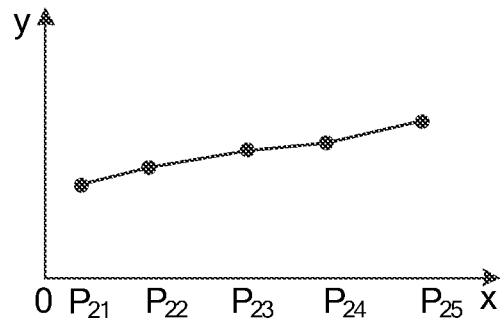
FIG. 8B is a line graph of a variation trend according to an embodiment.
Figure 8C:
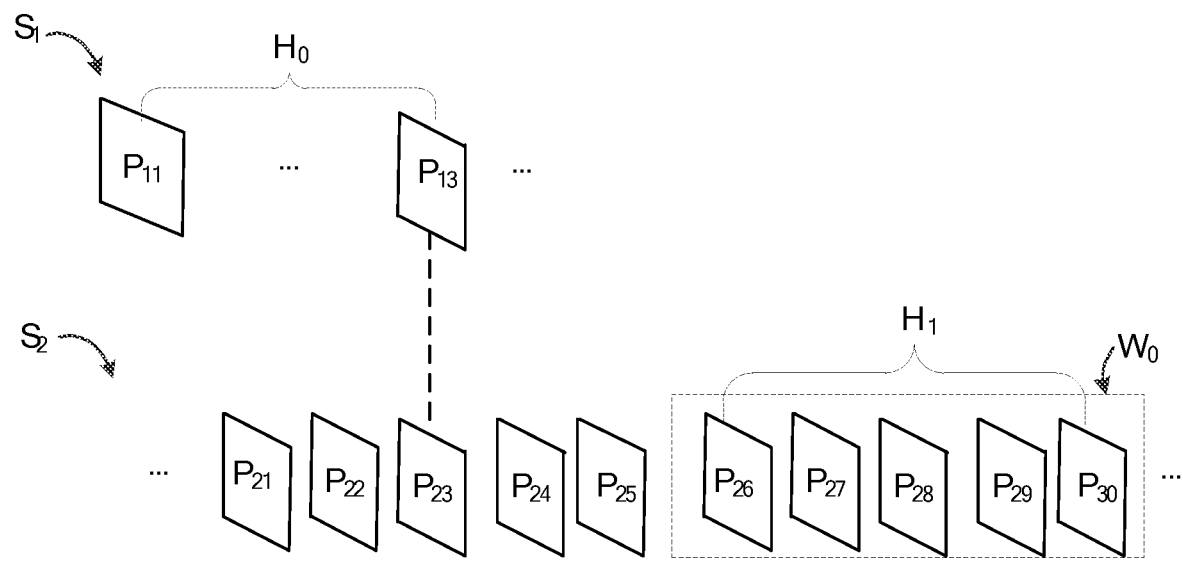
FIG. 8C is a schematic diagram illustrating the window in FIG. 7B after a sliding operation is performed according to an embodiment.

FIG. 8B is a line graph of a variation trend of matching degrees corresponding to image frames in a window. As shown in FIG. 8B, an x-axis indicates a serial number of each image frame, and a y-axis indicates a matching degree. Here, a value range of the matching degree may be, for example, [0, 1]. FIG. 8C is a schematic diagram illustrating the window in FIG. 7B after a sliding operation is performed according to an embodiment. The matching degrees corresponding to the image frames increase progressively in FIG. 8B, and the second image frame in the window in FIG. 7B is $P_{25}$. Accordingly, in step S805, the window may be slid forward (that is, in a rightward direction in FIG. 8C). As shown in FIG. 8C, the slid window $W_0$ may include image frames $P_{26}$ to $P_{30}$.

Therefore, in the method 800, the sliding direction may be determined according to the variation of the matching degrees of a plurality of second image frames in a second image frame sequence, to accurately determine and update the second image frame, thereby increasing the matching degree between the second image frame and the first image frame. In addition, in the method 800, by dynamically adjusting the sliding step length, a speed of determining the second image frame may be increased, that is, efficiency of determining a starting point is improved.

Figure 9:
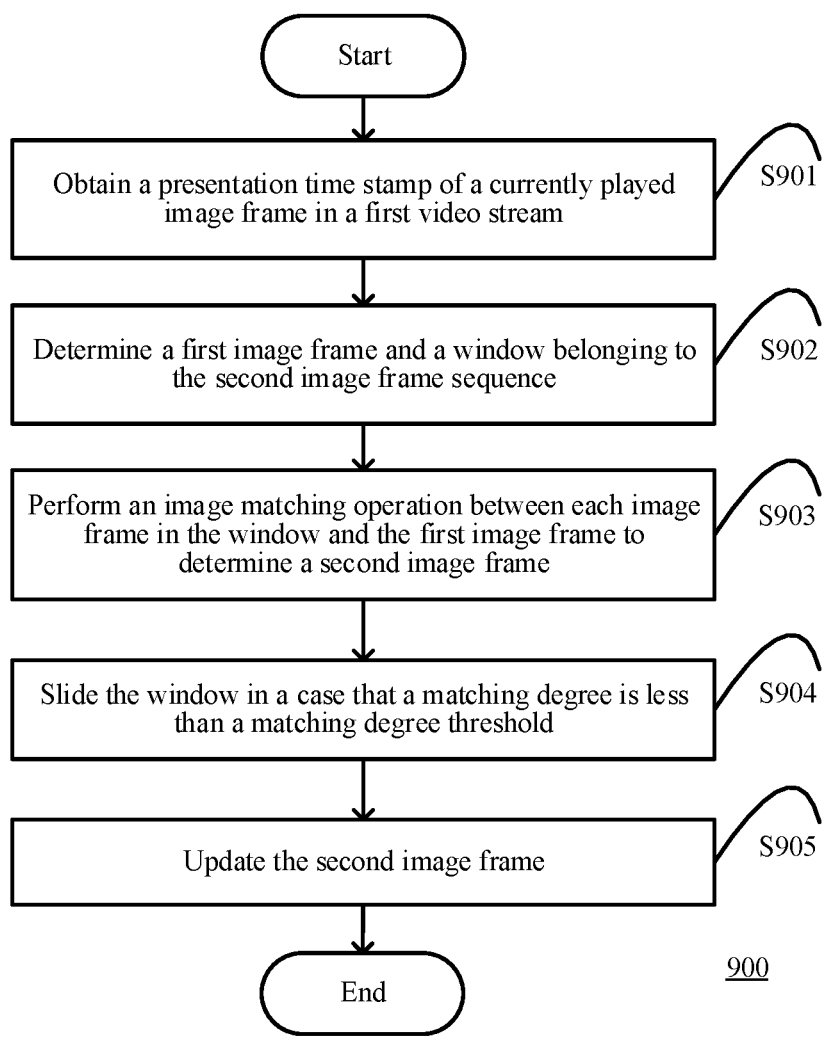
FIG. 9 is a flowchart of a method for performing step S302 in FIG. 3A according to an embodiment.

FIG. 9 is a flowchart of a method 900 for performing step S302 according to an embodiment. As shown in FIG. 9, the method 900 may include steps S901 to S903. Here, implementations of steps S901 to S903 are the same as those of steps S701 to S703, and details with respect to FIG. 7A may not be described again. The method 900 may further include step S904 and step S905.

In step S904, the window may be slid or shifted in a case that a matching degree between the first image frame and the second image frame is less than a matching degree threshold, so that the second image frame is in the middle of the slid window.

In step S905, an image frame having the highest matching degree with the first image frame is determined in the slid second window, and the second image frame is updated to be the determined image frame.

Accordingly, in the method 900, by keeping the second image frame in the middle of the slid window, a range of the second window can be quickly adjusted and the second image frame can be quickly updated, thereby increasing the matching degree between the switching point and the starting point.

Figure 10A:
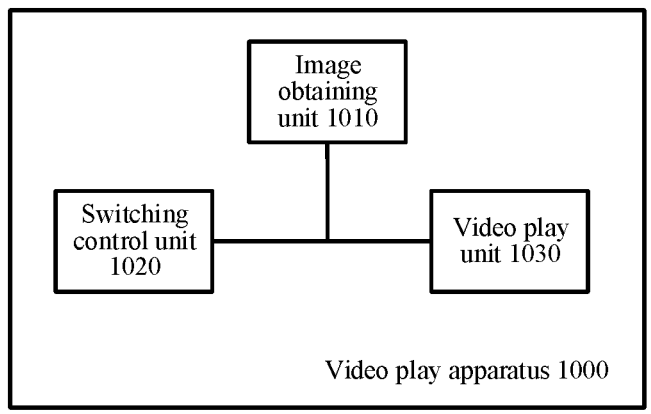
FIG. 10A is a schematic diagram illustrating a video play apparatus according to an embodiment.

FIG. 10A is a schematic diagram illustrating a video play apparatus 1000 according to an embodiment. The terminal device 110 may include a video play apparatus 1000. As shown in FIG. 10A, the video play apparatus 1000 may include an image obtaining unit 1010, a switching control unit 1020, and a video play unit 1030.

The image obtaining unit 1010 may be configured to obtain a first image frame sequence and a second image frame sequence in response to an instruction to switch from a first video stream to a second video stream. The first image frame sequence is from the first video stream, and the second image frame sequence is from the second video stream.

The switching control unit 1020 may be configured to determine a first image frame as a switching point in the first image frame sequence and a second image frame matching the first image frame in the second image frame sequence.

The video play unit 1030 may be configured to play the first video stream until the first image frame, and then start to play the second video stream by using the second image frame as a starting point.

Figure 10B:
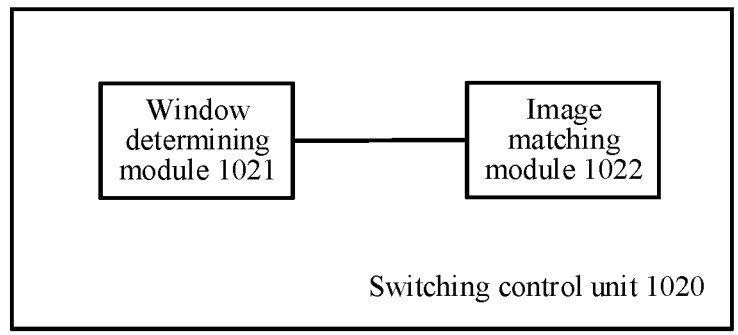
FIG. 10B is a schematic diagram illustrating a switching control unit according to an embodiment.

As shown in FIG. 10B, according to an embodiment, the switching control unit 1020 may include a window determining module 1021 and an image matching module 1022. The window determining module 1021 may be configured to obtain a reference PTS of a currently played image frame in the first video stream upon reception of the instruction to switch to the second video stream. In this way, according to the reference PTS, the window determining module 1021 may determine a first window and a second window. The first window may be a window including a plurality of first image frames in the first image frame sequence. The second window may be a window including a plurality of second image frames in the second image frame sequence.

In an embodiment, the window determining module 1021 may determine an image frame in the first image frame sequence that is spaced by a switching threshold from the reference PTS, use the determined image frame as a first reference image frame, and determine the first window with the first reference image frame being at the center of the first window. In addition, the window determining module 1021 may determine an image frame in the second image frame sequence in which PTS is the closest to that of the first reference image frame, and use the image frame as a second reference image frame. Based on this, the window determining module 1021 may determine the second window in the second image frame sequence with the second reference image frame being at the center of the second window.

The image matching module 1022 may be configured to perform an image matching operation between each image frame in the first window and each image frame in the second window, to determine two image frames having the highest matching degree. The image matching module 1022 may use one of the two image frames that belongs to the first window as the first image frame, and use the other image frame that belongs to the second window as the second image frame.

In an embodiment, the window determining module 1021 may be further configured to slide the first window and the second window in a case that a matching degree between the first image frame and the second image frame is less than a matching degree threshold, so that the first image frame is in the middle of the slid first window, and the second image frame is in the middle of the slid second window. The image matching module 1022 may be further configured to update the first image frame and the second image frame according to the slid first window and the slid second window. Specifically, the image matching module 1022 may perform an image matching operation between each image frame in the slid first window and each image frame in the slid second window to determine two image frames having the highest matching degree. Based on this determination, the image matching module 1022 may use one of the two image frames that belongs to the first window as an updated first image frame, and use the other image frame that belongs to the second window as an updated second image frame. Based on this, the switching control unit 1020 may further determine whether a matching degree between the updated first image frame and the updated second image frame reaches a matching degree threshold by the window determining module 1021. If the matching degree threshold is not reached, the switching control unit 1020 may further iteratively slide the first window and the second window and update the first image frame and the second image frame until the matching degree reaches the matching degree threshold.

Figure 10C:
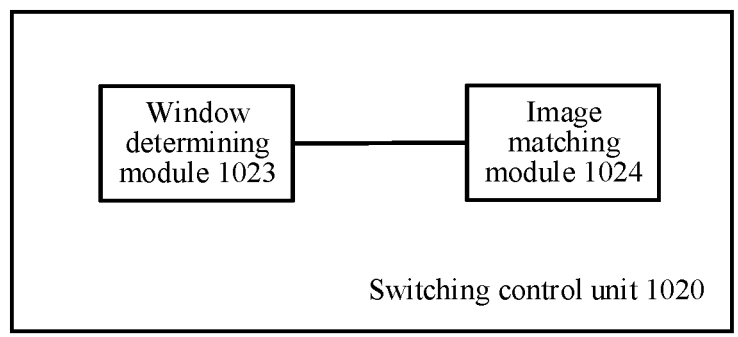
FIG. 10C is a schematic diagram illustrating a switching control unit according to another embodiment.

As shown in FIG. 10C, according to an embodiment, the switching control unit 1020 may further include a window determining module 1023 and an image matching module 1024.

The window determining module 1023 may be configured to obtain a reference PTS of a currently played image frame in the first video stream upon reception of the instruction to switch from the first video stream to a second video stream. According to the reference PTS, the window determining module 1023 may determine the first image frame and determine a window belonging to the second image frame sequence. In an embodiment, the window determining module 1023 may determine an image frame in the first image frame sequence that is spaced by a switching threshold from the reference PTS, and use the image frame as the first image frame. In an embodiment, the window determining module 1023 may determine an image frame in the second image frame sequence in which PTS is the closest to that of the first image frame, and use the determined second image frame as a second reference image frame. In this way, the window determining module 1023 may determine the window in the second image frame sequence that is centered on the second reference image frame.

The image matching module 1024 may be configured to perform an image matching operation between each image frame in the window and the first image frame, to determine an image frame having the highest matching degree with the first image frame in the second window, and use the determined image frame as the second image frame.

In an embodiment, the window determining module 1023 may be further configured to slide the window according to a variation trend of matching degrees corresponding to image frames in the window in a case that a matching degree between the first image frame and the second image frame is less than a matching degree threshold. In an embodiment, in a case that the matching degrees corresponding to the image frames increase progressively, the window determining module 1023 may slide or shift the window forward. In a case that the matching degrees corresponding to the image frames decrease progressively, the window determining module 1023 may slide or shift the window backward. In an embodiment, the window determining module 1023 may determine a sliding step length of the window according to a difference between the matching degree between the first image frame and the second image frame and the matching degree threshold. Based on the variation trend of the matching degrees, the window determining module 1023 may adjust an image frame range of the window according to the sliding step length. The image matching module 1024 is further configured to determine an image frame having the highest matching degree with the first image frame in the slid window, and update the second image frame to the determined image frame.

The window determining module 1023 may be further configured to slide the window in a case that a matching degree between the first image frame and the second image frame is less than a matching degree threshold, so that the second image frame is in the middle of the slid window. The image matching module may be further configured to determine an image frame having the highest matching degree with the first image frame in the slid first window, and update the second image frame to the determined image frame.

As such, the video play apparatus 1000 may determine the switching point (that is, the first image frame) of the first video stream and the starting point (that is, the second image frame) of the second video stream that match each other. Because the first image frame matches the second image frame, the video play apparatus 1000 can avoid a problem of a video repeating or skipping during video streaming switching, so that smooth switching can be performed between different video stream pictures, thereby improving picture continuity.

Figure 11:
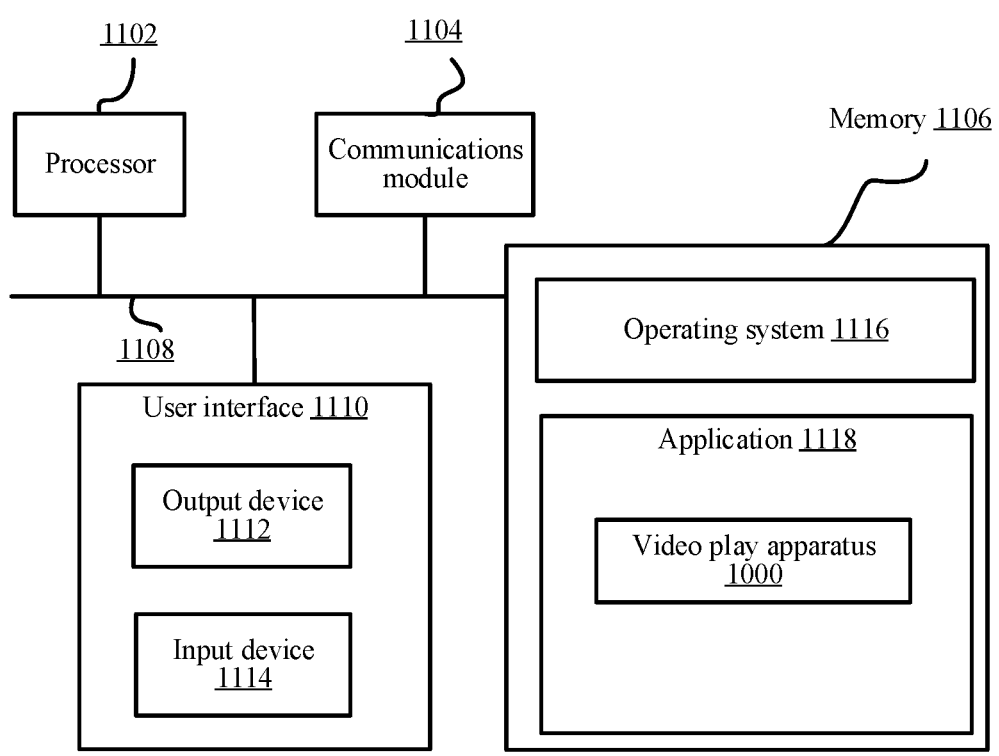
FIG. 11 is a structural diagram of a terminal device according to an embodiment.

FIG. 11 is a structural diagram of a terminal device according to an embodiment. As shown in FIG. 11, the terminal device may include one or more processors (for example, CPUs or GPUs) 1102, a communications module 1104, a memory 1106, a user interface 1110, and a communications bus 1108 for connecting the components described above. However, the embodiment is not limited hereto, and may include other components The processor 1102 may receive and send data by using the communications module 1104 to implement network communication and/or local communication.

The user interface 1110 may include one or more output devices 1112, including one or more speakers and/or one or more displays. The user interface 1110 may further include one or more input devices 1114, including, for example, a keyboard, a mouse, a sound command input unit or a microphone, a touch display, a touch-sensitive input panel, a posture capturing camera, or another input key or control.

The memory 1106 may be a high-speed random access memory (RAM) such as a DRAM, an SRAM, a DDR RAM, or another random access solid-state memory device; or a non-volatile memory such as one or more magnetic disk storage devices, optical disk storage devices, flash memory devices, or other non-volatile solid-state memory devices.

The memory 1106 stores an instruction set that can be executed by the processor 1102 and includes: an operating system 1116, including a program for processing basic system services and for executing hardware-related tasks; and an application 1118, including programs for implementing the video play method, where the program can implement the processing procedures in the foregoing embodiments, for example, the application 1118 may include the video play apparatus 1000 shown in FIG. 10A.

In addition, embodiments of the disclosure may be implemented by a data processing program executed by a data processing device such as a computer. In addition, a data processing program stored in a storage medium may be directly read from the storage medium for execution or the program installed on or replicated in a storage device (such as a hard disk or an internal memory) of a data processing device for execution. Therefore, such a storage medium may also fall within the scope of the disclosure. The storage medium may use any recording manner, for example, a paper storage medium (such as paper tape), a magnetic storage medium (such as a floppy disk, a hard disk, and a flash memory), an optical storage medium (such as a CD-ROM), and a magneto-optical storage medium (such as an MO).

Furthermore, a non-volatile storage medium may be used to store a data processing program. The data processing program may be configured to perform the foregoing video play method according to various embodiments of the disclosure.

In addition, the video play method according to various embodiments of the disclosure may be implemented not only by the data processing program, but also by hardware, such as a logic gate, a switch, an application-specific integrated circuit (ASIC), a programmable logic controller, and an embedded microcontroller. Therefore, any hardware configured to implement the embodiments of the disclosure may fall within the scope of the disclosure.

The foregoing descriptions are merely example embodiments of the disclosure, but are not intended to limit this disclosure. Any modification, equivalent replacement, or improvement made by one of ordinary skill in the art shall fall within the spirit and principle of the disclosure and within the protection scope of the disclosure.

What is claimed is:

1. A video play method, performed by a terminal device, the method comprising:

obtaining a first image frame sequence and a second image frame sequence in response to a switch instruction to switch from a first video stream to a second video stream, the first image frame sequence being in a form of the first video stream, and the second image frame sequence being in a form of the second video stream;

determining a first image frame as a switching point in the first image frame sequence;

determining a second image frame in the second image frame sequence that matches the first image frame, the second image frame being a starting point in the second image frame sequence; and playing the first image frame sequence at the first video stream until the switching point, and playing the second image frame sequence at the second video stream from the starting point, wherein the determining the second image frame comprises identifying a number of pixels matching between the first image frame and the second image frame, and determining the second image frame based on the number of pixels being greater than or equal to a predetermined threshold.

2. The method according to claim 1, wherein the determining the first image frame as the switching point in the first image frame sequence and the second image frame matching the first image frame in the second image frame sequence comprises:

obtaining a reference presentation time stamp (PTS) of a currently playing image frame based on receiving the switch instruction;

determining a first window and a second window according to the reference PTS, the first window comprising a plurality of first image frames in the first image frame sequence, and the second window comprising a plurality of second image frames in the second image frame sequence;

performing an image matching operation between each image frame in the first window and each image frame in the second window, to identify at least one of the plurality of first image frames and at least one the plurality of second image frames having the highest matching degree; and determining the first image frame as the identified at least one of the plurality of first image frames in the first window, and determining the second image frame as the identified at least one of the plurality of second image frames in the second window.

3. The method according to claim 2, wherein the determining the first window and the second window according to the reference PTS comprises:

determining a first reference image frame in the first image frame sequence that is spaced by a switching threshold from the reference PTS, and determining the first window based on the first reference image frame;

determining a second reference image frame in the second image frame sequence, a PTS of the second reference image frame being the closest to that of the first reference image frame; and determining the second window based on the second reference image frame.

4. The method according to claim 2, further comprising:
sliding the first window and the second window based on a matching degree between the first image frame and the second image frame being less than a matching degree threshold, so that the first image frame is in the middle of the slid first window, and the second image frame is in the middle of the slid second window; and updating the first image frame and the second image frame based on the slid first window and the slid second window.

5. The method according to claim 1, wherein the determining the first image frame as the switching point in the first image frame sequence and the second image frame matching the first image frame in the second image frame sequence comprises:

obtaining a reference PTS of a currently playing image frame in the first video stream based on receiving the switching instruction;

determining the first image frame according to the reference PTS, and determining a window in the second image frame sequence; and performing an image matching operation between each image frame in the window and the first image frame, to determine an image frame having the highest matching degree with the first image frame in the window, and using the image frame as the second image frame.

6. The method according to claim 5, wherein the determining the first image frame according to the reference PTS comprises:

determining an image frame in the first image frame sequence that is spaced by a switching threshold from the reference PTS, and using the image frame as the first image frame.

7. The method according to claim 5, wherein the determining the first image frame according to the reference PTS, and determining the window in the second image frame sequence comprises:

determining an image frame in the second image frame sequence in which a PTS of the image frame is the closest to a PTS of the first image frame, and using the image frame as a second reference image frame; and wherein the second reference image frame is at a center of the window in the second image frame sequence.

8. The method according to claim 5, further comprising:
based on a matching degree between the first image frame and the second image frame being less than a matching degree threshold, sliding the window according to a variation trend of matching degrees corresponding to image frames in the window; and determining an image frame in the window having the highest matching degree with the first image frame in the slid window, and updating the second image frame to the determined image frame.

9. The method according to claim 8, wherein the sliding the window according to the variation trend of matching degrees corresponding to image frames in the window comprises:

sliding the window forward based on the matching degrees corresponding to the image frames increasing progressively; and sliding the window backward based on the matching degrees corresponding to the image frames decreasing progressively.

10. The method according to claim 8, wherein the sliding the window according to the variation trend of matching degrees corresponding to image frames in the window comprises:

determining a sliding step length of the window according to a difference between the matching degree between the first image frame and the second image frame and the matching degree threshold; and adjusting an image frame range of the window based on the variation trend of the matching degrees according to the sliding step length.

11. The method according to claim 5, further comprising:
based on a matching degree between the first image frame and the second image frame being less than a matching degree threshold, sliding the window so that the second image frame is in the middle of the slid window; and determining an image frame having the highest matching degree with the first image frame in the slid window, and updating the second image frame to the determined image frame.

12. The method according to claim 3, wherein the first reference image frame is at a center among the plurality of first image frames in the first window, and wherein the second reference image frame is at a center among the plurality of second image frames in the second window.

13. A terminal device, comprising:
at least one memory configured to store computer program code;

at least one processor configured to access the computer program code and operate as instructed by the computer program code, the computer program code comprising:

image obtaining code configured to cause the at least one processor to obtain a first image frame sequence and a second image frame sequence in response to a switch instruction to switch from a first video stream to a second video stream, the first image frame sequence being in a form of the first video stream, and the second image frame sequence being in a form of the second video stream;

switching control code configured to cause the at least one processor to determine a first image frame as a switching point in the first image frame sequence, and determine a second image frame in the second image frame sequence that matches the first image frame, the second image frame being a starting point in the second image frame sequence; and video play code configured to cause the at least one processor to play the first image frame sequence at the first video stream until the switching point, and play the second image frame sequence at the second video stream from the starting point, wherein the switching control code is further configured to cause the at least one processor to identify a number of pixels matching between the first image frame and the second image frame, and determine the second image frame based on the number of pixels being greater than or equal to a predetermined threshold.

14. The terminal device of claim 13, wherein the switching control code is further configured to cause the at least one processor to:

obtain a reference presentation time stamp (PTS) of a currently playing image frame based on receiving the switch instruction;

determine a first window and a second window according to the reference PTS, the first window comprising a plurality of first image frames in the first image frame sequence, and the second window comprising a plurality of second image frames in the second image frame sequence;

performing an image matching operation between each image frame in the first window and each image frame in the second window, to identify at least one of the plurality of first image frames and at least one the plurality of second image frames having the highest matching degree; and determine the first image frame as the identified at least one of the plurality of first image frames in the first window, and determining the second image frame as the identified at least one of the plurality of second image frames in the second window.

15. The terminal device of claim 14, wherein the switching control code is further configured to cause the at least one processor to:

determine a first reference image frame in the first image frame sequence that is spaced by a switching threshold from the reference PTS, and determine the first window based on the first reference image frame;

determine a second reference image frame in the second image frame sequence, a PTS of the second reference image frame being the closest to that of the first reference image frame; and determine the second window based on the second reference image frame.

16. The terminal device of claim 14, wherein the switching control code is further configured to cause the at least one processor to:

slide the first window and the second window based on a matching degree between the first image frame and the second image frame being less than a matching degree threshold, so that the first image frame is in the middle of the slid first window, and the second image frame is in the middle of the slid second window; and update the first image frame and the second image frame based on the slid first window and the slid second window.

17. The terminal device of claim 13, wherein the switching control code is further configured to cause the at least one processor to:

obtain a reference PTS of a currently playing image frame in the first video stream based on receiving the switching instruction;

determine the first image frame according to the reference PTS, and determine a window in the second image frame sequence; and perform an image matching operation between each image frame in the window and the first image frame, to determine an image frame having the highest matching degree with the first image frame in the window, and using the image frame as the second image frame.

18. The terminal device of claim 17, wherein the switching control code is further configured to cause the at least one processor to:

based on a matching degree between the first image frame and the second image frame being less than a matching degree threshold, slide the window according to a variation trend of matching degrees corresponding to image frames in the window; and determine an image frame in the window having the highest matching degree with the first image frame in the slid window, and update the second image frame to the determined image frame.

19. The terminal device of claim 18, wherein the switching control code is further configured to cause the at least one processor to:

slide the window forward based on the matching degrees corresponding to the image frames increasing progressively; and slide the window backward based on the matching degrees corresponding to the image frames decreasing progressively.

20. A non-transitory computer readable storage medium, storing one or more programs including instructions, when executed by a terminal device, causing the terminal device to:

obtain a first image frame sequence and a second image frame sequence in response to a switch instruction to switch from a first video stream to a second video stream, the first image frame sequence being in a form of the first video stream, and the second image frame sequence being in a form of the second video stream;

determine a first image frame as a switching point in the first image frame sequence;

determine a second image frame in the second image frame sequence that matches the first image frame, the second image frame being a starting point in the second image frame sequence; and play the first image frame sequence at the first video stream until the switching point, and play the second image frame sequence at the second video stream from the starting point, wherein the one or more programs cause the terminal device to identify a number of pixels matching between the first image frame and the second image frame, and determine the second image frame based on the number of pixels being greater than or equal to a predetermined threshold.

\* \* \* \* \*